Patented Mar. 19, 1946

2,396,915

UNITED STATES PATENT OFFICE 2,396,915

MANUFACTURE OF NORMAL MAGNESIUM CARBONATE

Harold W. Greider and Roger A. MacArthur, Wyoming, Ohio, assignors to The Philip Carey Manufacturing Company, a corporation of Ohio No Drawing. Application August 16, 1938, Serial No. 225,140

6 Claims. (Cl. 23—67)

This invention relates to the manufacture of normal magnesium carbonate and to the manufacture of heat insulating materials containing normal magnesium carbonate.

In our copending application, Serial No. 225,139 filed August 16, 1938, issued March 3, 1942, as Patent No. 2,275,032, we have disclosed that aqueous mixtures of normal magnesium carbonate and basic magnesium carbonate can be molded substantially without drying shrinkage if the mixture is heated to a temperature sufficiently high to convert the normal carbonate into basic carbonate during or after molding and during or prior to drying. This property is of great economic importance in the manufacture of molded heat insulating materials.

Molded heat insulation materials are of diverse character. One well-known heat insulating material is 85 per cent magnesia which consists essentially of about 85 per cent by weight of basic carbonate of magnesia and 15 per cent by weight of asbestos fiber. Other substances such as calcium carbonate, diatomaceous earth, colloidal clays, mineral fibers, exfoliated vermiculite, and the like, may likewise be admixed with basic carbonate of magnesia in the manufacture of molded heat insulation material.

In the manufacture of molded heat insulating materials, for example 85 per cent magnesia, a slurry of basic carbonate of magnesia in water is placed in a tank with air or other agitation and is mixed with asbestos fiber as a reinforcing means. The mixture is then pumped to storage tanks from which it is pumped under pressure to filter molds where a part of the water is expelled and the mass becomes sufficiently compacted for removal from the molds. These molds may be of various shapes, depending upon the shape of insulating material being manufactured. For example, if slabs are to be made, the molds are of rectangular cross section. If pipe covering is to be made, the molds are of annular cross section. These molded rough shapes are commonly made considerably larger than the finished shape which is to be made from the dried shape, as account must be taken of the drying shrinkage and the fact that the drying shapes tend to warp. It is common practice in the manufacture of 85 per cent magnesia heat insulation, for example, that 30 per cent or more by weight of the dried shape, on the average, is trimmed off prior to sale and shipment of the material. This trim must be returned to the mixing tanks. The molded and wet shapes are placed on supports, which, in turn, are placed on trucks and placed in drying ovens. It is the function of the supports to hold the wet shapes without collapse or excessive deformation during the drying operation. These supports are usually made of heavy wire mesh or perforated sheet metal and aside from the expense of manufacture, must be constantly repaired and straightened at relatively great expense.

As disclosed in our co-pending application, Serial No. 225,139, (Patent No. 2,275,032) drying shrinkage of molded heat insulation can be greatly reduced and even substantially entirely eliminated by the incorporation of finely-divided normal magnesium carbonate crystals in an aqueous slurry of the ingredients of the heat insulation prior to molding the same. Also, the molded articles, after being heated to a sufficiently high temperature for a short period, set firmly, and become so hard and strong that they need no supports while drying. In the use of this method, the molded articles may be placed on a table or conveyor, and subjected to temperatures of from 175° F. to 300° F. or over for a short period. They may then be removed and further dried without necessity for supports. Also, the molded articles may be molded closely to the exact dimensions wanted in the dried insulation as the drying shrinkage is virtually eliminated.

The basic magnesium carbonate used in the manufacture of molded heat insulating materials is commonly prepared from the mineral dolomite by what is known as the Pattinson process. In the practice of this method, dolomite rock, which is essentially an equimolecular mixture of calcium carbonate and magnesium carbonate of the approximate chemical formula $MgCO_3.CaCO_3$ is first calcined, or "burned," in a kiln to convert the carbonate rock into a mixture of calcium oxide and magnesium oxide, essentially of the chemical formula $MgO.CaO$ and called dolomitic lime. This lime is then hydrated with water to form a dilute slurry of calcium and magnesium hydroxides, both substantially insoluble in water. This slurry is then treated by passing through it carbon dioxide-containing gas until all of the calcium hydroxide has been converted to insoluble calcium carbonate and substantially all of the magnesia is in the form of soluble magnesium bicarbonate of the chemical formula: $Mg(HCO_3)_2$. The solid matter is then separated from the mixture of insoluble calcium carbonate and soluble magnesium bicarbonate by filtration or settling or by a combination of these methods of separation.

The clarified liquor consists essentially of about a 3 per cent by weight solution of magnesium bicarbonate in water. In practice it is not feasible to make solutions containing more of the bicarbonate, as the carbon dioxide pressure and time which are both necessary for the production of higher concentrations, are not economically available. According to prior practice the solution of magnesium bicarbonate is then heated rapidly, or "boiled," at temperatures usually above 200° F., whereupon insoluble basic magnesium carbonate is precipitated. The basic carbonate is then available for use in the manufacture of molded heat insulations, but the manufacture of molded insulation therefrom has been attended with the excessive shrinkage during drying and the other attendant disadvantages and difficulties that have been mentioned hereinabove.

Normal magnesium carbonate may be produced from a solution of magnesium bicarbonate such as that occurring in the Pattinson process by allowing the solution to stand in air. However, the crystals of normal carbonate thus formed are too large and heavy to be suitable for use admixed with basic carbonate. Normal magnesium carbonate may also be prepared from bicarbonate solutions by treatment with soluble caustic alkalies, but these reagents are too expensive for use in the commercial production of heat insulations.

It is a purpose of this invention to avoid the difficulties due to excessive shrinkage of molded insulations comprising basic magnesium carbonate, using magnesium bicarbonate solution such as that occurring in the Pattinson process as a source of magnesia. It is a further purpose of this invention to recover normal magnesium carbonate from magnesium bicarbonate solution by a simple and economical process and in suitable form for use in the manufacture of molded heat insulation material.

We have discovered that normal magnesium carbonate of suitable characteristics for use in the manufacture of heat insulation materials may be prepared commercially and economically from magnesium bicarbonate solution such as that occurring in the Pattinson process by subjecting the magnesium bicarbonate solution to a controlled heat treatment. Moreover, the heat treatment can be controlled so that part of the magnesium bicarbonate remains in the mother liquor and can be separated from the precipitated normal carbonate. It is a further feature of our method that magnesium bicarbonate remaining in the mother liquor can be converted into basic carbonate of magnesia by boiling the mother liquor and that the basic carbonate of magnesia thus produced is available for combination with the normal magnesium carbonate produced as aforesaid and for use in the manufacture of molded heat insulation material according to the method referred to hereinabove and described in our said application, Serial No. 225,139 (Patent No. 2,275,032) which inhibits drying shrinkage.

We have found that normal magnesium carbonate in suitable form can be prepared from a magnesium bicarbonate solution, e. g., the magnesium bicarbonate solution occurring in the Pattinson process, if the solution is heated to a temperature above about 140° F. and if the normal magnesium carbonate that is formed is not exposed to a temperature above about 158° F. for a sufficient period of time to decompose it to basic carbonate. The following are illustrative examples of the practice of this invention.

A solution of magnesium bicarbonate of about 3 per cent. concentration is first introduced continuously into a boiler, the contents of which are held at a temperature of 158° F. or below by open steam introduced therein. Below 140° F., insufficient velocity of decomposition occurs. In this boiler, normal magnesium carbonate crystals are formed and the heated slurry runs from the boiler continuously. The solid normal magnesium carbonate in the withdrawn slurry is separated from the undecomposed bicarbonate solution by methods well known to the art such as settling or filtering or both. In a boiler operating as above disclosed, that is, at 140° F. to 158° F. and at atmospheric pressure, with a normal boiler cycle of about 12 minutes (the time any given particle of solution remains in the boiler), about 67 per cent of the magnesia in the bicarbonate solution is recoverable as normal magnesium carbonate. The undecomposed solution is then transferred to a second boiler where it is boiled at a temperature above 190° F. and preferably above 200° F., until substantially all of the remaining magnesium bicarbonate decomposes to form basic magnesium carbonate. The normal magnesium carbonate from the first boiler may be washed if desired. It has been found possible to control the particle size of the normal carbonate so as to make the particle size smaller in the final product by removing more or less of the mother liquor entrained in the paste as by washing the paste with water. Agitation of the aqueous mass during the precipitation of the normal magnesium carbonate also aids in the production of fine crystals of normal magnesium carbonate. The normal carbonate is then available for admixture with the basic carbonate formed as above disclosed.

By carrying on the operations above described at reduced pressure higher yields of normal magnesium carbonate can be obtained. Moreover, when the continuous boiling is carried on under reduced pressure, temperatures above 158° F. may be maintained provided the normal magnesium carbonate is not exposed to the higher temperature for a sufficiently long time to convert the normal magnesium carbonate into basic carbonate. A temperature of about 175° F. is the maximum that can be utilized practically in a continuous boiling operation even when the pressure is reduced to the minimum (about one-half atmosphere) determined by the vapor pressure of the aqueous mixture being treated. Under such conditions a boiling cycle of about 20 minutes gives a high yield of normal carbonate. A very high yield of the normal carbonate (nearly 100%) can be attained by maintaining a boiler cycle of about 10 minutes at a pressure of about ½ atmospheric pressure and at a temperature of about 170° F. When reduced pressures as well as atmospheric pressures are taken into consideration, the normal magnesium carbonate is produced under the controlled heating described herein by heating magnesium bicarbonate solution to a temperature of about 140° F. to about 175° F., the normal magnesium carbonate not being exposed for a sufficient period of time at the pressure under which it is maintained to decompose it to the basic carbonate. The process above described is particularly suited for a continuous operation wherein the bicarbonate solution is introduced continuously into a heating chamber and normal magnesium carbonate is continuously withdrawn from the heating chamber.

Normal magnesium carbonate may be produced from magnesium bicarbonate solution in the practice of this invention not only by a continuous boiling operation as described above but also by a batch operation. When the batch operation is practiced the formation of normal magnesium carbonate can be carried out not only within the temperature limits above mentioned but also at higher temperatures provided the formation of the normal carbonate is initiated within the limits of temperature and pressure above described and provided the normal magnesium carbonate is chilled before it decomposes to basic carbonate. For example, a volume of magnesium bicarbonate solution, e. g., 100 gallons, is introduced at approximately normal atmospheric temperature into a boiling tank equipped with open steam jets and maintained at normal atmospheric pressure. The temperature is then brought up by means of this steam to about 200° F. as rapidly as possible. We have found that ten minutes is a suitable time. During this rapid heating the formation of normal magnesium carbonate is initiated below 158° F. and continues at the higher temperatures, the yield of normal magnesium carbonate being high. The production of basic carbonate is prevented by chilling the resulting slurry as by addition of cold water until the temperature of the mass is reduced to about 158° F. or under and/or by washing the normal carbonate with water which is at a temperature below about 158° F. The yield in this case has been found to be about 90–92 per cent of the magnesia in the magnesium bicarbonate as normal carbonate. It is important that the solution be heated rapidly from less than about 158° F. to the maximum so that the formation of normal magnesium carbonate may be initiated below this temperature inasmuch as this method of heating tends to prevent the formation of basic carbonate. The undecomposed magnesium bicarbonate in the solution is separated from the precipitated normal carbonate and the normal carbonate can be washed with water as above mentioned. The separated solution is subsequently boiled in the usual way to produce basic magnesium carbonate. The basic magnesium carbonate may then be used with normal magnesium carbonate produced as aforesaid in the manufacture of molded heat insulation materials in the manner above described.

If the batch process is carried out at reduced pressures a very high yield (nearly 100% of the magnesia in the magnesium bicarbonate solution) can be obtained. Under reduced pressures the formation of the normal carbonate can be instituted at temperatures above 158° F., e. g. at temperatures up to about 175° F. when a high vacuum is employed. Moreover, the normal magnesium carbonate does not have to be chilled to 158° F. to prevent decomposition to normal carbonate so long as it is maintained under vacuum. However, when the normal carbonate is brought to atmospheric pressure it should be at a temperature of 158° F. or less. By agitating the aqueous mass during the precipitation of the normal magnesium carbonate the formation of fine crystals is promoted.

It is important to initiate the formation of normal magnesium carbonate in the batch process before the temperature is carried above that at which the normal magnesium carbonate is stable for otherwise the magnesium bicarbonate decomposes to form the basic magnesium carbonate as in the previously known Pattinson process.

According to the foregoing procedure a stepwise treatment of magnesium bicarbonate solution such as that occurring in the Pattinson process is made available whereby part of the magnesium bicarbonate is converted by a simple and economical treatment into normal magnesium carbonate which is recovered and the balance of the magnesium bicarbonate is converted into basic magnesium carbonate which is also recovered. The normal and basic carbonates may then be commingled in the manufacture of molded heat insulation material with resultant inhibiting of drying shrinkage and great improvement upon the prior practice of merely using basic magnesium carbonate such as that resulting from the Pattinson process as the magnesia component of the molded heat insulation. While the normal magnesium carbonate produced as aforesaid is advantageously combined with basic carbonate of magnesia obtained after separation of the normal magnesium carbonate from its mother liquor, the normal magnesium carbonate can likewise be combined with basic magnesium carbonate obtained from other sources. Moreover, the special treatment of magnesium bicarbonate solution herein described in itself is to be regarded as a feature of this invention.

While this invention has been described hereinabove in connection with certain examples of the practice of this invention, it is to be understood that this has been done merely to illustrate the practice of this invention and that the scope of this invention is to be governed by the language of the following claims.

We claim:

1. The manufacture of normal magnesium carbonate which comprises heating a magnesium bicarbonate solution to a temperature above substantially 140° F. under temperature and pressure conditions at which normal magnesium carbonate is stable to initiate the precipitation of normal magnesium carbonate then rapidly heating the normal magnesium carbonate thus formed and residual bicarbonate solution to rapidly precipitate further normal magnesium carbonate at a temperature at which the normal magnesium carbonate is unstable and chilling the normal magnesium carbonate thus formed to a temperature at which the normal magnesium carbonate is stable before it decomposes to basic carbonate, and separating the chilled normal magnesium carbonate from the mother liquor.

2. The method of claim 1 wherein the rapid heating step is carried to at least substantially 200° F. to form normal magnesium carbonate and the normal magnesium carbonate thus produced is then rapidly chilled to below substantially 158° F. before it decomposes to basic carbonate.

3. The manufacture of normal magnesium carbonate from magnesium bicarbonate solution which comprises decomposing a magnesium bicarbonate solution with liberation of carbon dioxide and formation of normal magnesium carbonate by subjecting said solution to sustained heating at a temperature between 140° F. and 175° F., said sustained heating being effected by continuously introducing magnesium bicarbonate solution to be decomposed into a body of solution maintained at such temperature and under a vapor pressure at which normal magnesium carbonate is formed and continuously withdrawing normal magnesium carbonate precipitated in said body of solution from said body of solution, said normal magnesium carbonate remaining stable at the temperature and at the vapor pressure under which said body of solution is maintained for the period of time during which said normal magnesium carbonate remains after precipitation in the body of solution, and separating and recovering said normal magnesium carbonate from the mother liquor.

4. The manufacture of normal magnesium carbonate from magnesium bicarbonate solution which comprises decomposing said magnesium bicarbonate solution with liberation of carbon dioxide and formation of normal magnesium carbonate by subjecting said solution to sustained heating at a temperature between 140° F. and 158° F. and at approximately atmospheric pressure for a period of time during which said normal magnesium carbonate remains stable, and separating and recovering said normal magnesium carbonate from the mother liquor before said normal magnesium carbonate thus formed decomposes to basic magnesium carbonate.

5. The manufacture of normal magnesium carbonate from magnesium bicarbonate solution which comprises precipitating normal magnesium carbonate from said solution by heating said solution to a temperature between 140° F. and 175° F. under a pressure at which normal magnesium carbonate is formed by decomposition of said magnesium bicarbonate with liberation of carbon dioxide from the solution and continuing said precipitation of normal magnesium carbonate from said solution by continuing to subject said solution to a temperature above 140° F., said normal magnesium carbonate not being exposed to such temperature for a sufficient period of time at the vapor pressure under which the solution is maintained to decompose said normal magnesium carbonate to basic magnesium carbonate, and separating said normal magnesium carbonate thus formed from the mother liquor prior to such decomposition.

6. The manufacture of normal magnesium carbonate from magnesium bicarbonate solution which comprises decomposing said magnesium bicarbonate solution with liberation of carbon dioxide and formation of normal magnesium carbonate by subjecting said solution to sustained heating at a temperature between 140° F. and 175° F. for a period of time during which and at a pressure under which said normal magnesium carbonate remains stable, and separating and recovering said normal magnesium carbonate from the mother liquor before said normal magnesium carbonate decomposes to basic magnesium carbonate.

HAROLD W. GREIDER.
ROGER A. MacARTHUR.